US011310698B2

United States Patent
Mandelli et al.

(10) Patent No.: US 11,310,698 B2
(45) Date of Patent: Apr. 19, 2022

(54) OVERLOAD CONTROL MECHANISM

(71) Applicant: Nokia Solutions and Networks Oy, Espoo (FI)

(72) Inventors: Silvio Mandelli, Tamm (DE); Alessandro Lieto, Milan (IT)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/412,778

(22) Filed: Aug. 26, 2021

(65) Prior Publication Data

US 2022/0070737 A1    Mar. 3, 2022

(30) Foreign Application Priority Data

Aug. 28, 2020   (FI) ................................ 20205838

(51) Int. Cl.
*H04W 28/24*   (2009.01)
*H04W 24/08*   (2009.01)
(Continued)

(52) U.S. Cl.
CPC ........... *H04W 28/24* (2013.01); *H04W 24/08* (2013.01); *H04W 28/0268* (2013.01); *H04W 76/36* (2018.02)

(58) Field of Classification Search
CPC . H04W 28/24; H04W 24/08; H04W 28/0268; H04W 76/36; H04W 28/0247;
(Continued)

(56) References Cited

U.S. PATENT DOCUMENTS 9,338,693 B2 * 5/2016 Mahindra .............. H04L 65/80
10,499,276 B2  12/2019 Chan et al.
(Continued)

FOREIGN PATENT DOCUMENTS

EP           3461087 A1    3/2019
WO       2019/185130 A1   10/2019
(Continued)

OTHER PUBLICATIONS

Office action received for corresponding Finnish Patent Application No. 20205838, dated Dec. 16, 2020, 10 pages.
(Continued)

*Primary Examiner* — Ahmed Elallam
(74) *Attorney, Agent, or Firm* — Nokia Technologies Oy (57) ABSTRACT

An overload control mechanism involving at least an intra slice instance and two or more inter slice instances is disclosed. The inter slice instance is monitoring how two or more network slices use resources. If the use is not within slice constraints, the intra slice instance determines, per a network slice, an amount of resources to be released by the network slice; and causes commanding network slices to release resources correspondingly. An intra slice instance is configured at least to determine, in response to detecting reception of a command to release resources or that one or more of flows do not reach quality of service level, an amount corresponding to resources missing to satisfy quality of service requirements of active flows; sorting flows to an order according to a predetermine sorting rule for flows; and releasing resources flow by flow according to the order.

14 Claims, 4 Drawing Sheets

(51) Int. Cl.
*H04W 28/02* (2009.01)
*H04W 76/36* (2018.01)
*H04W 72/04* (2009.01)
*H04L 12/24* (2006.01)

(58) Field of Classification Search
CPC ... H04W 72/04; G06F 9/5077; H04L 41/0896
See application file for complete search history.

(56) References Cited

U.S. PATENT DOCUMENTS

| | | | |
|---|---|---|---|
| 10,638,356 B2* | 4/2020 | Andrews | H04W 72/046 |
| 10,892,958 B2* | 1/2021 | Bor-Yaliniz | H04L 41/5012 |
| 10,939,309 B2* | 3/2021 | Peng | H04W 36/00837 |
| 11,012,312 B2* | 5/2021 | Jana | H04L 41/5019 |
| 11,150,949 B2* | 10/2021 | Wu | G06F 3/0607 |
| 2018/0123961 A1* | 5/2018 | Farmanbar | H04L 43/0888 |
| 2019/0150158 A1 | 5/2019 | Farmanbar et al. | |
| 2019/0182752 A1 | 6/2019 | Lou et al. | |
| 2019/0281494 A1 | 9/2019 | Chan et al. | |
| 2020/0029242 A1 | 1/2020 | Andrews et al. | |
| 2020/0044943 A1* | 2/2020 | Bor-Yaliniz | H04L 41/5025 |
| 2020/0068431 A1 | 2/2020 | Han et al. | |
| 2020/0178093 A1* | 6/2020 | Peng | H04W 72/085 |
| 2020/0186411 A1* | 6/2020 | Ravichandran | H04L 41/0668 |
| 2020/0195495 A1* | 6/2020 | Parker | H04M 15/8038 |
| 2020/0260427 A1* | 8/2020 | Schefczik | H04W 72/0406 |
| 2021/0037400 A1* | 2/2021 | Yao | H04W 24/08 |
| 2021/0037544 A1* | 2/2021 | Andrews | H04W 72/1257 |
| 2021/0243086 A1* | 8/2021 | Jana | H04L 41/0806 |
| 2021/0306281 A1* | 9/2021 | Vilgelm | H04L 47/781 |

FOREIGN PATENT DOCUMENTS

| | | |
|---|---|---|
| WO | 2020/033174 A1 | 2/2020 |
| WO | 2020/212640 A1 | 10/2020 |

OTHER PUBLICATIONS

Mandelli et al., "Satisfying network slicing constraints via 5G MAC scheduling", IEEE Conference on Computer Communications, Apr. 29-May 2, 2019, pp. 2332-2340.

Andrews et al., "The Effect of Additive and Multiplicative Scheduler Weight Adjustments on 5G Slicing Dynamics", IEEE 2nd 5G World Forum (5GWF), Sep. 30-Oct. 2, 2019, pp. 34-39.

Caballero et al., "Network Slicing for Guaranteed Rate Services: Admission Control and Resource Allocation Games", IEEE Transactions on Wireless Communications, vol. 17, No. 10, Oct. 2018, pp. 6419-6432.

Khodapanah et al., "Slice Management in Radio Access Network via Iterative Adaptation", IEEE International Conference on Communications (ICC), May 20-24, 2019, 7 pages.

"3rd Generation Partnership Project; Technical Specification Group Services and System Aspects; Management and orchestration; Provisioning; (Release 16)", 3GPP TS 28.531, V16.3.0, Sep. 2019, pp. 1-70.

"Communication of Acceptance under section 29a of Patent Decree" for corresponding Finnish Patent Application No. 20205838, dated Jun. 11, 2021, Finish Patent and Registration Office, 7 pages.

Extended European Search Report received for corresponding European Patent Application No. 21192726.4, dated Jan. 21, 2022, 12 pages.

* cited by examiner

OVERLOAD CONTROL MECHANISM

TECHNICAL FIELD

Various example embodiments relate to wireless communications and, particularly, to overload control in network slicing.

BACKGROUND

Wireless communication systems are under constant development. One way to meet the need for faster communication and huge increase of the data amount is network slicing, in which virtualized and independent logical networks are multiplexed on the same physical network infrastructure.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides an apparatus comprising at least one processor; and at least one memory including computer program code, the at least one memory and computer program code configured to, with the at least one processor, cause the apparatus at least to perform: monitoring how two or more network slices use resources; determining, in response to the use not being within slice constraints, per a network slice, an amount of resources to be released by the network slice; and causing commanding network slices to release resources correspondingly.

In an embodiment, the at least one memory and computer program code are configured to, with the at least one processor, cause the apparatus further to perform the monitoring by checking per a network slice whether the slice violates its maximum resource constraint and/or other slices' minimum resources constraints and/or its maximum rate constraint and/or other slices' minimum resource constraints.

In an embodiment, the at least one memory and computer program code are configured to, with the at least one processor, cause the apparatus further to perform: sorting, in response to the use not being within slice constraints, the network slices to an order according to a predetermined rule; causing commanding network slices one network slice at a time according to the order; in response to receiving from a network slice information that more resources than the amount in the command were released, updating amounts of resources to be released of network slices that have not yet been commanded to release resources.

In an embodiment, the at least one memory and computer program code are configured to, with the at least one processor, cause the apparatus further to perform for at least one of the two or more network slices an intra-slice procedure comprising: determining, in response to the command to release resources a first amount or in response to one or more of flows of the slice not reaching quality of service level of the flow, a second amount corresponding to resources missing to satisfy quality of service requirements of active flows; sorting, in response to having two or more flows, the flows to an order according to a predetermine sorting rule for flows; and releasing resources flow by flow according to the order until enough resources have been released.

An aspect provides an apparatus comprising at least one processor; and at least one memory including computer program code, the at least one memory and computer program code configured to, with the at least one processor, cause the apparatus at least to perform: determining, in response to detecting that a command to release resources a first amount is received or that one or more of flows do not reach quality of service level of the flow, a second amount corresponding to resources missing to satisfy quality of service requirements of active flows; sorting, in response to having two or more flows, the flows to an order according to a predetermine sorting rule for flows; releasing resources flow by flow according to the order until enough resources have been released.

In an embodiment, enough resources have been released when a released amount of resources is at least equal to the sum of the first amount and the second amount.

In an embodiment, the releasing includes removing the flow or degrading the quality of service of the flow.

In an embodiment, the quality of service is a bit rate requirement.

In an embodiment, the sorting rule is based on one or more of key performance indicators comprising a spectral efficiency, an achieved throughput, a guaranteed quality of service, and a priority.

In an embodiment, the at least one memory and computer program code are configured to, with the at least one processor, cause the apparatus further to perform the sorting of flows by performing at least the following: in response to flows having each at least the same throughput than its minimum throughput constraint but different priorities, sorting the flows according to the priority order, so that resources of a flow with a lower priority are released before resources of flows with higher priority; in response to flows each at least having the same throughput than its minimum throughput constraint and the same priorities, determining spectral efficiencies of the flows and sorting the flows so that resources of a flow with lower spectral efficiency are released before resources of flows with higher spectral efficiency; and in response to flows each at least having the same throughput than its minimum throughput constraint, the same priorities, and the same spectral efficiencies, sorting the flows according to mobile identifiers associated with the flows.

In an embodiment, the at least one memory and computer program code are configured to, with the at least one processor, cause the apparatus further to perform: determining, per a flow, a packet delay budget failure ratio; and in response to the packet delay budget failure ratio of the flow being above a threshold, removing the flow.

An aspect provides a method comprising: monitoring how two or more network slices use resources; determining, in response to the use not being within slice constraints, per a network slice, an amount of resources to be released by the network slice; and causing commanding network slices to release resources correspondingly.

An aspect provides a method comprising: determining, in response to detecting that a command to release resources a first amount is received or that one or more of flows do not reach quality of service level of the flow, a second amount corresponding to resources missing to satisfy quality of service requirements of active flows; sorting, in response to having two or more flows, the flows to an order according to a predetermine sorting rule for flows; releasing resources flow by flow according to the order until enough resources have been released.

An aspect provides a computer program comprising instructions for causing an apparatus to perform at least one of a first process and a second process, wherein the first process comprises the following: monitoring how two or more network slices use resources; determining, in response to the use not being within slice constraints, per a network slice, an amount of resources to be released by the network slice; and causing commanding network slices to release resources correspondingly, wherein the second process comprises the following: determining, in response to detecting that a command to release resources a first amount is received or that one or more of flows do not reach quality of service level of the flow, a second amount corresponding to resources missing to satisfy quality of service requirements of active flows; sorting, in response to having two or more flows, the flows to an order according to a predetermine sorting rule for flows; releasing resources flow by flow according to the order until enough resources are released.

An aspect provides a computer readable medium comprising program instructions for causing an apparatus to perform at least one of a first process and a second process, wherein the first process comprises the following: monitoring how two or more network slices use resources; determining, in response to the use not being within slice constraints, per a network slice, an amount of resources to be released by the network slice; and causing commanding network slices to release resources correspondingly, wherein the second process comprises the following: determining, in response to detecting that a command to release resources a first amount is received or that one or more of flows do not reach quality of service level of the flow, a second amount corresponding to resources missing to satisfy quality of service requirements of active flows; sorting, in response to having two or more flows, the flows to an order according to a predetermine sorting rule for flows; releasing resources flow by flow according to the order until enough resources are released.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
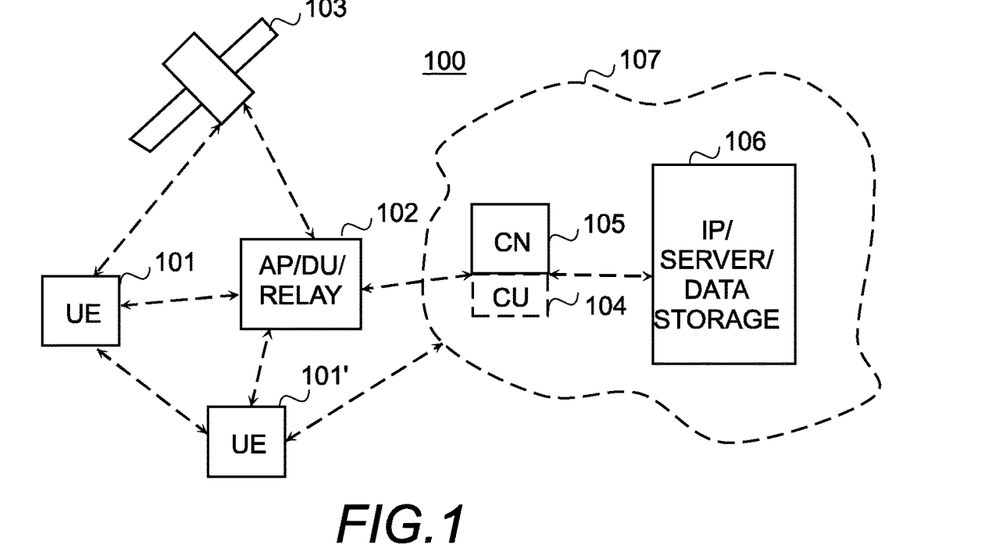
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (SGW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and interRI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multiaccess edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
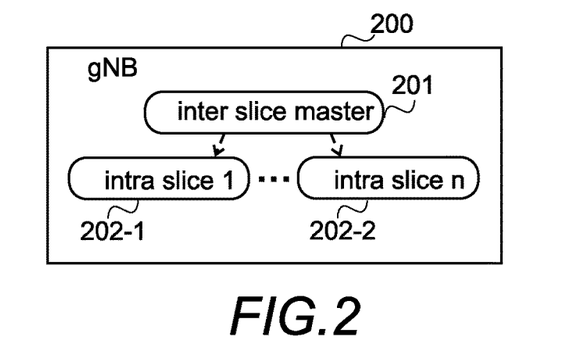
FIG. 2 is a schematic block diagram.

FIG. 2 illustrates an access node, such as a base station gNB for the new radio, the base station being configured to support radio access network slicing. In the network slicing, virtual radio access network instances, called slices, are created, with tailored set of virtualized control functions, such as scheduling, and mobility management, based on individual slice/service requirements while at the same time ensuring performance guarantees and/or service level agreement guarantees between different slices. The slices can be seen to correspond to various applications, or services, like mobile broadband or ultra-reliable low-latency communication, and/or verticals, like automotive, and/or tenants, also called mobile virtual network operators, which have different statistical characteristics and different requirements for performance and for quality of experience/quality of service. To take into account that radio resources needed per slice vary, radio resources provided by the cell may be allocated (split) between the slices by defining for a slice a minimum amount of the resources and a maximum amount of resources, the minimum amount guaranteeing resources for a service level agreement and the maximum amount of resources being the upper limit the slice can schedule at a time or on average over a time window. The resource allocation may be based on resource partitioning (reserved spectrum) or resource sharing (spectrum shared), for example.

To provide an overload control mechanism configured to take into account the flexibility given by the minimum and maximum constraints, for example by minimum and maximum resource constraints and/or by minimum and maximum rate constraints, the access node is configured to contain an inter slice master instance 201, which may be an instance within an orchestrator, i.e. within the instance allowing resources for slices. The inter-slice master instance is configured to monitor resource use of slices, and to command slices, if need is detected during monitoring, to release resources, as will be described in detail with FIG. 3. As a counter-party to the inter-slice master instance, the slices comprise intra slice instances 202-1, 202-2. An intra slice instance 202-1, 202-2 of a slice provides slice-specific release of resources, as will be described in detail with FIG. 4. In other words, in the disclosed example, the inter slice master instance 201 monitors the behavior of the plurality of slices in the cell and may command the slices to release resources, and the intra slice instance 202-1, 202-2 determines how to release resources in a single slice, if commanded to release resources. In other words, the intra slice instances 202-1, 202-2 are independent of each other.

The inter-slice master instance 201 may be in a layer 2 packet scheduler in the access node, or it may be an instance in a higher layer entity. One or more of the intra-slice instances 202-1, 202-2 or all of them or none of them may reside in the same entity, for example in the layer 2 packet scheduler, as the inter-slice master instance 201. Further, it should be appreciated that even though in the example of FIG. 2 the instances locate in the access node, that need not to be the case. The instances may locate in different nodes or units. For example, the central unit (CU) may comprise the inter-slice master instance 201 and the distributed unit (DU) may comprise one or more intraslice instances 202-1, 202-2.

Figure 3:
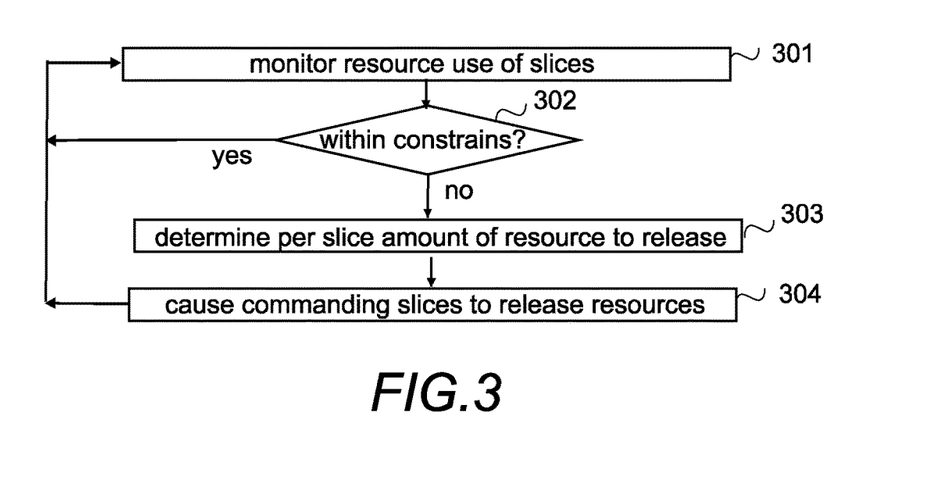
FIGS. 3 to 8 illustrate example functionalities.

FIG. 3 illustrates an example of a functionality of the inter-slice master instance in the access node having two or more slices. The described functionality may run periodically, being executed every few seconds, for example, and/or triggered by any congestion situation detected by the wireless network, for example by the layer 2 packet scheduler.

Referring to FIG. 3, resource use of the two or more slices is monitored in block 301 by checking current obtained resources by all slices. If the resources used remain within the resource constraints (block 302: yes), the monitoring in block 301 continues. If the resources used do not remain within the resource constraints (block 302: no), the amount of resources to release are determined in block 303 per a slice, and commanding the two or more slices to release resources by the determined amounts is caused in block 304. Then the process returns to block 301 to continue the monitoring.

As can be seen, it is possible to monitor and control service level agreements fulfillment in the slices without waiting for a slice to be congested before any corrective actions are made. Further, instead of borrowing resources from other cells, commands are dispatched to the two or more slices, to solve the resource constraints violation within the cell and its resources.

The functionality of FIG. 3 may be implemented by an algorithm ISRM (inter slice resource monitoring) according to the following pseudocode 1:

1: function ISRM (X, Q)
2: T=0, Δ=0
3: for ∀j∈J do
4: if $X_j < \zeta_j^{min} - t^{min}$ then
5: $\Delta_j = X_j - \zeta_j^{min}$
6: $T = T - \Delta_j$
7: $X_j = \zeta_j^{min}$
8: else if $X_j > \zeta_j^{max} + t^{max}$ then
9: $\Delta_j = Xj - \zeta_j^{max}$
10: $T = T - \Delta_j$
11: $X_j = \zeta_j^{max}$
12: if T>0 then
13: Δ=Δ+RS(T, $\zeta^{min}$, X)
14: return Δ
wherein
bold symbols refer to the sets of all elements
X=current obtained resources
Q=quality of service
T=desired resources
Δ=amount of resources to be released
j=slice
J=set of slices
$\zeta_j^{min}$=minimum resource constraint (0 if none given)
$t^{min}$=threshold to relax minimum resource constraint
$\zeta_j^{max}$=maximum resource constraint
$t^{max}$=threshold to relax maximum resource constraint
RS=redistribute surplus function (algorithm), for example according to the following pseudocode 2:
15: function RS(T, $\zeta^{min}$, X)
16: $\kappa = X - \zeta^{min}$
17: $R = (\Sigma \kappa)^{-1} \cdot \kappa T$
18: return R
wherein
κ=surplus vector In the above pseudocode 1 in line 2 desired resources and the amount of resources to be released are initialised, and then initial check on minimum and maximum constraints is performed per a slice. In case the current obtained resources of a slice is less than the relaxed minimum constraint of the slice (row 4), the total resource to be released is increased (row 6), and in case the current obtained resources of a slice is more than the relaxed maximum constraint of the slice (row 8), resources are released down to the maximum constraint (row 9), and the total resource to be released is decreased (row 10).

If after the initial check on the minimum and maximum constraints of all slices the amount of desired resources is more than zero, there are still resources to be released and the redistribute surplus function is performed.

After that the amount of resources to be released is known, per a slice, and the inter slice master instance can provide a set of commands to release resources. The resources to be released per a slice depends on the violated slice constraints by the slice itself (maximum resource constraint, and/or maximum rate constraint) and/or other slices' violated minimum constraints (minimum resource constraint, and/or minimum rate constraint).

Instead of the pseudocode 2 algorithm for the surplus redistribution, any other algorithm/routine may be used, provided that it ensures that the right amount of resources are released, and minimum resource constraints are fulfilled.

Figure 4:
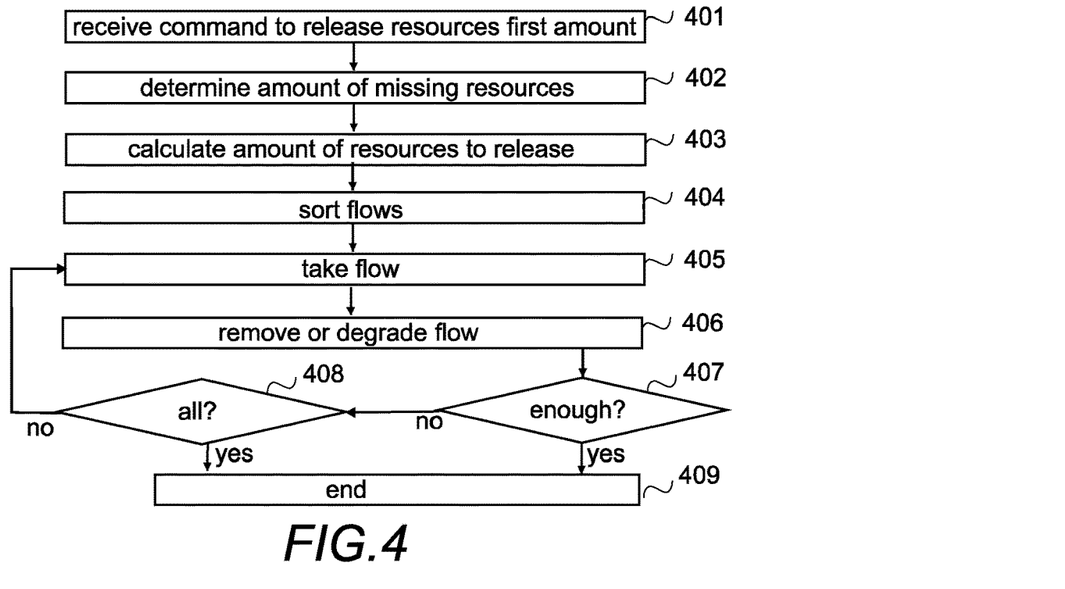

FIG. 4 illustrates an example of a functionality of the intra-slice instance. As said above, the slices perform the functionality illustrated in FIG. 4 independently, and using their own policies. Herein, a flow is an atomic entity that demands for data transfer, the term flow thereby covering also a data radio bearer and a user device.

Referring to FIG. 4, when a command to release certain amount, a first amount, of resource is received in block 401, flow constraints of the slice are taken into account by determining in block 402 the amount of resources missing to satisfy bit rate requirements of active flows. Examples of the bit rate requirements include requirements for a guaranteed bit rate and a nominal bit rate.

For example, following formula may be used to determine the amount of resources missing to satisfy the bit rate requirements:

$$AM = \sum_{i \in J_i} \left( \max\left[ \left( \frac{\beta_i^{min}}{R_i} - 1 \right) X_i, 0 \right] \right)$$

wherein
AM=the amount of missing resources
$J_i$=set of all constraints belonging to the flow i
$\beta_i^{min}$=minimum bit rate constraint target for flow i
$R_i$=smoothed bit rate experienced by flow i in the last period
$X_i$=smoothed amount of resources experienced by flow i in the last period
$R_i$ and $X_i$ may be smoothed using any smoothing in time technique, for example, using exponential smoothing.

When the amount of resources missing has been determined, the amount of resources to release are calculated in block 403 by calculating the sum of the first amount received in block 401, and a second amount, which is the amount of resources missing to satisfy the bit rate requirement, determined in block 402.

In the example of FIG. 4 it is assumed that the result of block 403 is that there is resources to be released. Naturally, if there is no resources to release the process would end herein.

To release resources, the flows are sorted to a release order. The release order may be called importance order or priority order. Any pre-determined sorting rule may be used. A sorting rule may be based, for example, on one or more of key performance indicators. A non-limiting list of such key performance indicators include a spectral efficiency of a flow, an achieved throughput of the flow, a guaranteed quality of service of the flow and/or a slice, and a priority (soft/hard priority) of the flow or the slice. One example of a sorting rule is described with FIG. 6. A difference between the hard priority and the soft priority is that the hard priority depends only on priority index value, whereas the soft priority depends also on other metrics, as is done in the above examples. For example, when hard priority is used, all flows of a lower priority slice are removed before flows of a higher priority slice, whereas when soft priority is used a lower priority slice may still have one or more flows when flows of a higher priority slice are removed.

In the illustrated example, a flow undergoes this process once during an execution round of the procedure and in the next execution round the flow may undergo this process again. When the flows have been sorted to release order, a flow that has not yet undergone this process and is next according to the release order is taken in block 405 to be processed. (If the flows are sorted to a queue to an ascending order, the first one is taken, if they are sorted to a descending order, the last one is taken.) Then the flow is in block 406 either removed, or its quality of service is degraded, depending on the bit rate requirement and possible other criteria defined for the slice instance. For example, a guaranteed bit rate may be degraded to a nominal bit rate, the nominal bit rate may be degraded to the best effort, and if the bit rate constraint is the best effort, the flow is released.

After removing or degrading the flow, it is checked in block 407, whether enough resources have been released. When determining the amount of resources released in block 406, both the resources allocated to the flow and the missing resources to satisfy the bit rate requirement of the flow may be taken into account. In other words, in block 407 it is checked whether all resources released amounts to the resources calculated in block 403. If not (block 407: no), the process checks in block 408, whether all flows have undergone the removal or degrading (block 406). If not (block 408: no), the process continues to block 405 to take a flow to be processed.

If enough resources have been released (block 407: yes), or if there is no unprocessed flows left (block 408: no), the released/degrade process ends, and will be triggered next time, when a new command to release resources is received from the inter slice master instance is received.

In an example the value obtained as a result in block 403 is decremented, when a flow is released, by the amount of resources the flow was getting, and when a flow is degraded, by the amount of difference of the resource requirements of the constraints, and when, after being decremented, the result value is zero or less than zero, enough resources has been released.

The amount of resources, which are decremented, may be calculated as follows:

$$RA = \left[\frac{\beta_i^{min}}{R_i}\right]_1 X_i$$

wherein
RA=resources released
$\beta_i^{min}$=minimum bit rate constraint target for flow i
$R_i$=smoothed bit rate experienced by flow i in the last period
$X_i$=smoothed amount of resources experienced by flow i in the last period In an implementation, the amount of data waiting to be transmitted in a transmit buffer of the instance is taken into account by using it as one factor for determining the value of the minimum bit rate constraint target for the flow i. For example, its value may depend on the quality of service type and the data in the transmit buffer, as follows:
  full transmit buffer, use given minimum bit rate constraint target for the flow
  small continuous packet arrivals with guaranteed bit rate, use minimum between the arrival rate and the given minimum bit rate constraint target for the flow
  packet transfers or nominal bit rate, use zero if there is no traffic in the buffer, and use minimum between the arrival rate and the given minimum bit rate constraint target for the flow, when there is traffic in the buffer It should be appreciated that the above are mere non-limiting examples.

Figure 5:
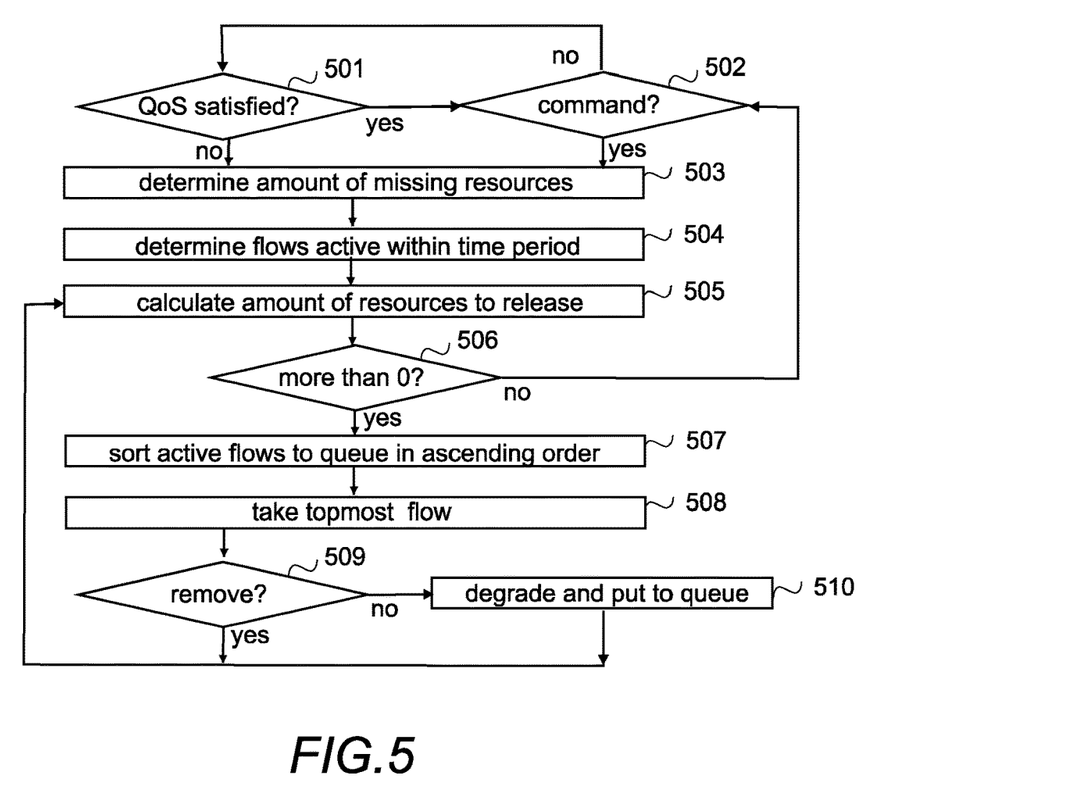

FIG. 5 illustrates another example of a functionality of the intra-slice instance. In the illustrated example of FIG. 5, the procedure may be triggered either when a command is received or when the instance detects that one or more of its flows does not reach its quality of service level, a degraded flow may undergo within one execution round the procedure until the flow is released and that active flows are sorted to the ascending order.

Referring to FIG. 5, the process is not triggered, if the quality of service (QoS) is satisfied (block 501: yes) and no command to release resources is received (block 502: no).

If a bit rate requirement of any of the flows is not satisfied, the quality of service is not satisfied (block 502: no), the process is triggered and the amount of resources missing to satisfy the bit rate requirement are determined in block 503, resulting to the second amount. Block 503 corresponds to block 402 and therefore it is not described more detail. However, since the quality of service is not satisfied, the result of block 503, i.e. the second amount, will be more than zero. Further, since no command was received, zero is used as the first amount.

If a command to release the resources the first amount is received from the inter slice master instance (block 502: yes), the process is triggered and the amount of resources missing to satisfy the bit rate requirement are determined in block 503. When the process is triggered in response to the command, the result of block 503, i.e. the second amount, may be less or more than zero or equal to the zero.

Triggering the process also cause that flows that have been active within a predetermined time period are determined in block 504. Then the amount of resources to be released are calculated in block 505, as described above, and it is checked in block 506, whether the amount is more than zero. If the amount of resources is more than zero (block 506: yes), the active flows are sorted in block 506 to a queue in the ascending order, using a predetermined rule, as described with block 404, an example of the rule being illustrated in FIG. 6.

The topmost flow is taken in block 508, and it is either removed (block 509: yes), or if not removed (block 509: no) its quality of service is degraded in block 510 and the flow is put back to the queue in block 510. (A removed flow is not any more active, whereas a degraded flow is.) Whether the flow is removed or degraded depends on the bit rate requirement and possible other criteria defined for the slice instance, as explained with block 406.

After removing (block 509: yes) or degrading (block 510), the process returns to block 505 to re-calculate the amount of resources to be released, the calculating taking into account the resources released in block 509 or in block 510, using the principles described above with blocks 403 and 407.

If the amount of resources to be released is zero or less (block 506: no), the execution round ends and the process returns to monitor, whether a command is received (block 502), or a quality of service is not satisfied (block 501).

Figure 6:
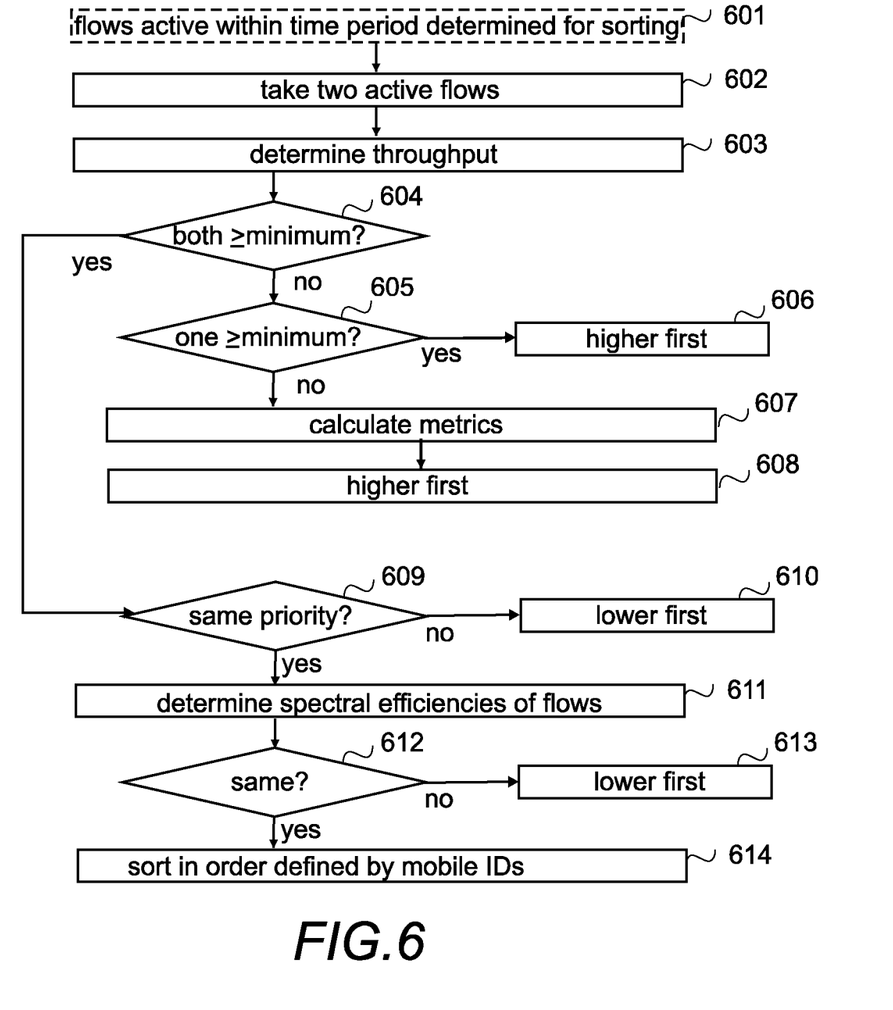

FIG. 6 illustrates an example of a sorting rule, in which the flows are ordered by performing a process to a pair of rules, as long as the flows are in the sorted order. In the illustrated example, it is assumed that active flows are sorted to an ascending order, meaning that the first one is the one that releases resources before the second one.

Referring to FIG. 6, a presumption is that flows that have been active within a predetermined time period before sorting have been determined in block 601. The active flows are sorted by performing to all combinations of two flows the following sorting procedure, starting by taking in block 602 two of the active flows to determine their order. The throughput of the flows is determined in block 603. If at least one of the flows do not have the same or higher throughput than its minimum throughput constraint of the flow (block 604: no), it is checked in block 605, whether one of them has a higher throughput than its minimum throughput constraint. If one of the flows has the same or a higher throughput (block 605: yes) than its minimum throughput constraint, it is sorted in block 606 to be the first one in the order (and then the one having throughput lower than the minimum throughput is the second one in the order). The minimum throughput constraint is a minimum throughput target required to be enforced. For the guaranteed bit rate it may be the same as $\beta_i^{min}$ but for the nominal bit rate and the best effort it may be smaller than $\beta_i^{min}$.

If both flows have the same or a higher throughput than the minimum throughput (block 604: yes), it is checked in block 609, whether the flows have the same priority. If not (block 609: no), the one having the lower priority is sorted in block 610 to be the first one in the order (and then the one having the higher priority is the second one in the order).

If both flows have the same or a higher throughput than the minimum throughput (block 604: yes), and the same priority (block 609: yes), spectral efficiencies of the flows are determined in block 611, and if they are different (block 612: no), the one having the lower is sorted in block 613 to be the first one in the order.

If both flows have the same or a higher throughput than the minimum throughput (block 604: yes), the same priority (block 609: yes), and the same spectral efficiency (block 612: yes), the flows are sorted in block 614 using corresponding mobile identifiers as a default ordering criterion. For example, the one having the smaller identifier is sorted in block 614 to be the first one in the order.

Figure 7:
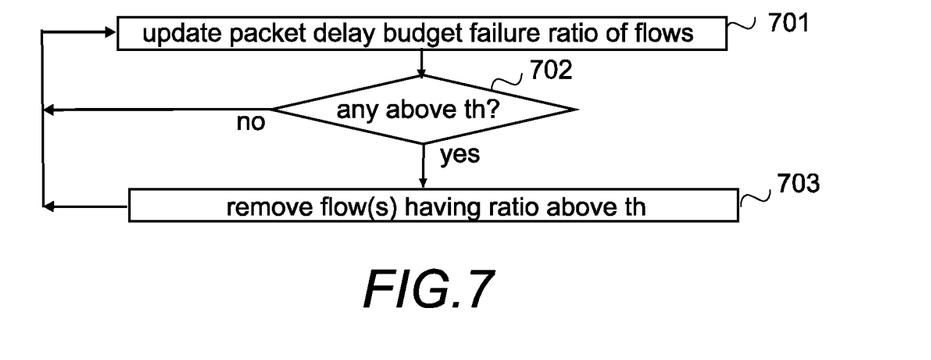

The intra slice instance may be configured further run in parallel with a process based on FIG. 4 or 5, a process described in FIG. 7 to detect and remove latency critical flows, if needed.

Referring to FIG. 7, packet delay budget failure ratio of latency critical flows is updated in block 701, per a flow.

The packet delay budget failure ration of a flow may be determined using exponential smoothing or averaging window.

When exponential smoothing is used, assuming that each flow is associated with an averaging window, following formula may be used:

$$\gamma_i^{exp} + \alpha_i \gamma_i^{exp} + (1-\alpha_i) \cdot I$$

wherein
$\gamma_i^{exp}$=the packet delay budget failure ratio of flow i
$\alpha_i$=variable value for flow i
I=1, if d>$D_i$, otherwise 0, wherein d is the measured experienced delay and $D_i$ the packet delay budget of the flow i The variable $\alpha_i$ may be selected to match a desired averaging window. For example, following formula, in which an effect of a failure is smoothed to $e^{-1}$ after certain updates, may be used:

$$\alpha_i = e^{-Pi/AW}$$

wherein
Pi=packet inter-arrival time

AW=averaging window, for example 2000 ms
In an embodiment, $\gamma_i^{exp}$ may be initialized to zero.
When the averaging window is used, after receiving $N^{th}$ packet, following formula may be used:

$$\gamma_i^{AW} = \frac{1}{\langle AW/Pi \rangle} \sum_n^N I$$

wherein
$\gamma_i^{AW}$=the packet delay budget failure ratio of flow i
AW=averaging window, for example 2000 ms
Pi=packet inter-arrival time
n=N−<AW/Pi>+1
<AW/Pi>=ceil of AW/Pi
I=1, if d>$D_i$, otherwise 0, wherein d is the measured experienced delay and $D_i$ the packet delay budget of the flow i In both above examples, if the packet inter-arrival time is not known, an estimate may be used, or a value based on previous differences of two consecutive packet arrivals may be used.

Regardless how the failure ratios are determined, they are compared in block 702 to a predetermined threshold th. The threshold may be, for example, 2%. If there are one or more flows whose failure ratio is above the threshold (block 702), the one or more flows having the failure ratio above the threshold are removed in block 703, and the process returns to block 701. In an implementation, if averaging window was used in block 701, after block 703 the exponential smoothing will be used in block 701, If all failure ratios are equal to or smaller than the threshold (block 702: no), the process returns to block 701.

Although not illustrated in FIG. 7, the process may be frozen during a congestion time of the network.

Although not illustrated in FIGS. 3 to 7, when the resources are updated, tokens of modified data resource bearers or slices are reset and updated correspondingly.

Figure 8:
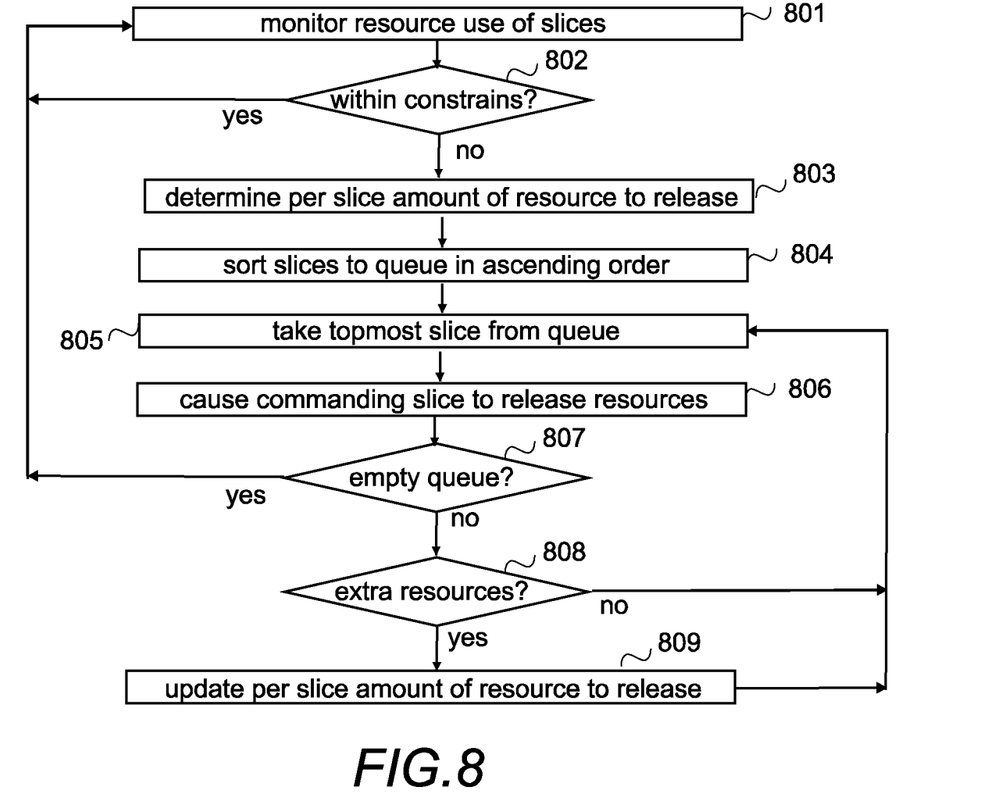

Further, it may happen that a slice releases more resources than needed, due to the process releasing resources per flow. Depending on an implementation, the extra resources thus obtained may be shared within the slice or re-used by other slices, provided that the minimum resource constraint of the slice is not violated. There exists several possibilities to re-assign resources. For example, the slices may be arranged in an ascending order of priority, and the extra resources could be dedicated to increase slice resources of one or more higher priority slices, starting from the slice of the highest priority. If the processes (releasing and commanding) are performed in parallel, and if the process of FIG. 3 is performed so that slices are processed in a priority order, starting from the lowest one, and a command to release resources is caused to be sent immediately it has been determined, information of the extra resources may be used to decrease the amount of resources to release by the higher priority slices. FIG. 8 illustrates such a procedure in more detail.

Referring to FIG. 8, resource use of the two or more slices is monitored in block 801, corresponding to block 301, by checking current obtained resources by all slices. If the resources used remain within the resource constraints (block 802: yes), the monitoring in block 801 continues. If the resources used do not remain within the resource constraints (block 802: no), the amount of resources to release are determined in block 803 per a slice, as described with block

303. The slices, whose resources are determined to be released, are also sorted in block 804 to a queue in an ascending order of priority.

The topmost slice form the queue is taken in block 805 and commanding the slice to release resources by the determined amount is caused in block 806. If the slice was not the last slice to be commanded, i.e. the queue is not empty (block 807: no) and if the slice informs that it released more resources than the amount in the command in block 806, i.e. information of extra resources is received (block 808: yes), the extra resources will be used in block 809 to update the amount of resources to release for at least one slice by decreasing the amount of resources. Then (after block 809), or if no extra resources were released (block 808: no), the process proceeds to block 805 to take the topmost slice. (Naturally, if the update in block 809 results that no resources should be released, the slice or slices are taken from the queue, and if it causes the queue to be empty, the process returns to block 801 to continue monitoring.)

If all slices are commanded to release resources (block 807: yes), the process returns to block 801 to continue the monitoring.

As is evident, the above examples disclose overload control mechanisms that are slice-aware and can be configured take into account flexible slice resources, provided by the minimum and maximum slice constraints. Thereby it can guarantee service level agreement/quality of service protecting within individual slices. There is no need to wait for a specific slice congestion situation before triggering the overload control mechanism. Since slices are commanded slice-specifically, there is no need to borrow resources to/from other cells or a single slice, but borrowing may be possible in some implementations, if the slice in question indicates extra resources. As a summary, the examples allow slice flexible resource utilization with the service level agreement guarantee and customization, per a slice, intra-slice flow sorting policies, when resources are to be released by a slice. Since resources are released slice-specifically, flows are removed also based on the slice they belong to, thereby allowing monitoring resource utilization by all slices (tenants).

The blocks and related functions described above by means of FIGS. 2 to 8 are in no absolute chronological order, and some of them may be performed simultaneously or in an order differing from the given one. Other functions can also be executed between them or within them and/or other rules applied or selected. Some of the blocks or part of the blocks can also be left out or replaced by a corresponding block or part of the block.

Figure 9:
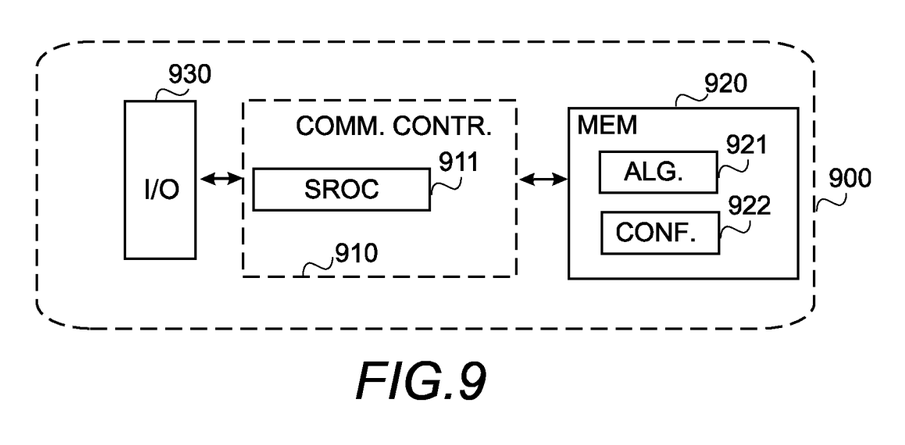
FIG. 9 is a schematic block diagram.

FIG. 9 illustrates an apparatus 900 comprising a communication controller 910 such as at least one processor or processing circuitry, and at least one memory 920 including a computer program code (software, algorithm) ALG. 921, wherein the at least one memory and the computer program code (software, algorithm) are configured, with the at least one processor, to cause the respective apparatus to carry out any one of the embodiments, examples and implementations described above. The apparatus of FIG. 9 may be an electronic device.

Referring to FIG. 9, the memory 920 may be implemented using any suitable data storage technology, such as semiconductor based memory devices, flash memory, magnetic memory devices and systems, optical memory devices and systems, fixed memory and removable memory. The memory may comprise a configuration storage CONF. 922, such as a configuration database, for at least storing (permanently or temporarily) one or more configurations and/or corresponding parameters/parameter values, for example the slice constraints and/or flow related information. The memory 920 may further store a data buffer for data waiting for transmission and/or data waiting to be decoded.

Referring to FIG. 9, the apparatus 900 may further comprise a communication interface 930 comprising hardware and/or software for realizing communication connectivity according to one or more radio communication protocols. The communication interface 930 may provide the apparatus with radio communication capabilities in a wireless network. The communication interface may comprise standard well-known analog radio components such as an amplifier, filter, frequency-converter and circuitries, conversion circuitries transforming signals between analog and digital domains, and one or more antennas or antenna arrays comprising plurality of antennas. Digital signal processing regarding transmission and/or reception of signals may be performed in a communication controller 910.

The apparatus 900 may further comprise an application processor (not illustrated in FIG. 9) executing one or more computer program applications that generate a need to transmit and/or receive data The application processor may execute computer programs forming the primary function of the apparatus.

The communication controller 910 may comprise one or more slice radio overload control (SROC) mechanism 911 configured to perform resource releasing and/or overload detecting according to any one of the embodiments/examples/implementations described above.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile device or a similar integrated circuit in a sensor, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. For example, the non-transitory medium may be a nontransitory computer readable medium comprising program instructions for causing an apparatus to perform at least one of a first process and a second process, wherein the first process comprises the following: monitoring how two or more network slices use resources; determining, in response to the use not being within slice constraints, per a network slice, an amount of resources to be released by the network slice; and causing commanding network slices to release resources correspondingly, wherein the second process comprises the following: determining, in response to detecting that a command to release resources a first amount is received or that one or more of flows do not reach quality of service level of the flow, a second amount corresponding to resources missing to satisfy quality of service requirements of active flows; sorting, in response to having two or more flows, the flows to an order according to a predetermine sorting rule for flows; releasing resources flow by flow according to the order until enough resources are released.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising
at least one processor; and
at least one memory including computer program code, the at least one memory and computer program code configured to, with the at least one processor, cause the apparatus at least to perform:
monitoring how two or more network slices use resources;
determining, in response to the use not being within slice constraints, per a network slice, an amount of resources to be released by the network slice; and
causing commanding network slices to release resources correspondingly.

2. An apparatus according to claim 1, wherein the at least one memory and computer program code configured to, with the at least one processor, cause the apparatus further to perform the monitoring by checking per a network slice whether the slice violates its maximum resource constraint and/or other slices' minimum resources constraints and/or its maximum rate constraint and/or other slices' minimum resource constraints.

3. An apparatus according to claim 1, wherein the at least one memory and computer program code configured to, with the at least one processor, cause the apparatus further to perform:
sorting, in response to the use not being within slice constraints, the network slices to an order according to a predetermined rule;
causing commanding network slices one network slice at a time according to the order;
in response to receiving from a network slice information that more resources than the amount in the command were released, updating amounts of resources to be released of network slices that have not yet been commanded to release resources.

4. An apparatus according to claim 1, wherein the at least one memory and computer program code configured to, with the at least one processor, cause the apparatus further to perform for at least one of the two or more network slices an intra-slice procedure comprising:
determining, in response to the command to release resources a first amount or in response to one or more of flows of the slice not reaching quality of service level of the flow, a second amount corresponding to resources missing to satisfy quality of service requirements of active flows;

sorting, in response to having two or more flows, the flows to an order according to a predetermine sorting rule for flows; and releasing resources flow by flow according to the order until enough resources have been released.

5. An apparatus comprising at least one processor; and at least one memory including computer program code, the at least one memory and computer program code configured to, with the at least one processor, cause the apparatus at least to perform:

determining, in response to detecting that a command to release resources a first amount is received or that one or more of flows do not reach quality of service level of the flow, a second amount corresponding to resources missing to satisfy quality of service requirements of active flows;

sorting, in response to having two or more flows, the flows to an order according to a predetermine sorting rule for flows;

releasing resources flow by flow according to the order until enough resources have been released.

6. An apparatus according to claim 5, wherein enough resources have been released when a released amount of resources is at least equal to the sum of the first amount and the second amount.

7. An apparatus according to claim 5, wherein the releasing includes removing the flow or degrading the quality of service of the flow.

8. An apparatus according to claim 5, wherein the quality of service is a bit rate requirement.

9. An apparatus as claimed in claim 5, wherein the sorting rule is based on one or more of key performance indicators comprising a spectral efficiency, an achieved throughput, a guaranteed quality of service, and a priority.

10. An apparatus according to claim 5, wherein the at least one memory and computer program code configured to, with the at least one processor, cause the apparatus further to perform the sorting of flows by performing at least the following:

in response to flows having each at least the same throughput than its minimum throughput constraint but different priorities, sorting the flows according to the priority order, so that resources of a flow with a lower priority are released before resources of flows with higher priority;

in response to flows each at least having the same throughput than its minimum throughput constraint and the same priorities, determining spectral efficiencies of the flows and sorting the flows so that resources of a flow with lower spectral efficiency are released before resources of flows with higher spectral efficiency; and in response to flows each at least having the same throughput than its minimum throughput constraint, the same priorities, and the same spectral efficiencies, sorting the flows according to mobile identifiers associated with the flows.

11. An apparatus according to claim 5, wherein the at least one memory and computer program code configured to, with the at least one processor, cause the apparatus further to perform:

determining, per a flow, a packet delay budget failure ratio; and in response to the packet delay budget failure ratio of the flow being above a threshold, removing the flow.

12. A method comprising:

monitoring how two or more network slices use resources;

determining, in response to the use not being within slice constraints, per a network slice, an amount of resources to be released by the network slice; and causing commanding network slices to release resources correspondingly.

13. A method according to claim 12, further comprising:

determining, in response to detecting that a command to release resources a first amount is received or that one or more of flows do not reach quality of service level of the flow, a second amount corresponding to resources missing to satisfy quality of service requirements of active flows;

sorting, in response to having two or more flows, the flows to an order according to a predetermine sorting rule for flows;

releasing resources flow by flow according to the order until enough resources have been released.

14. A non-transitory computer readable medium comprising program instructions for causing an apparatus to perform at least one of a first process and a second process:

wherein the first process comprises the following:

monitoring how two or more network slices use resources;

determining, in response to the use not being within slice constraints, per a network slice, an amount of resources to be released by the network slice; and causing commanding network slices to release resources correspondingly, wherein the second process comprises the following:

determining, in response to detecting that a command to release resources a first amount is received or that one or more of flows do not reach quality of service level of the flow, a second amount corresponding to resources missing to satisfy quality of service requirements of active flows;

sorting, in response to having two or more flows, the flows to an order according to a predetermine sorting rule for flows;

releasing resources flow by flow according to the order until enough resources are released.

\* \* \* \* \*